United States Patent [19]

Marlett

[11] Patent Number: 4,632,816

[45] Date of Patent: Dec. 30, 1986

[54] PROCESS FOR PRODUCTION OF SILANE

[75] Inventor: Everett M. Marlett, Baton Rouge, La.

[73] Assignee: Ethyl Corporation, Richmond, Va.

[21] Appl. No.: 701,947

[22] Filed: Feb. 15, 1985

Related U.S. Application Data

[63] Continuation-in-part of Ser. No. 449,486, Dec. 13, 1982, abandoned.

[51] Int. Cl.$^4$ .............................................. C01B 33/04
[52] U.S. Cl. .................................... 423/347; 423/111; 423/464
[58] Field of Search ................ 423/347, 111, 465, 495

[56] References Cited

U.S. PATENT DOCUMENTS 4,407,783  10/1983  Ulmer et al. ........................ 423/347

FOREIGN PATENT DOCUMENTS

| 052808 | 2/1982 | European Pat. Off. |
| 823496 | 1/1959 | United Kingdom . |
| 832333 | 4/1960 | United Kingdom . |
| 851962 | 10/1960 | United Kingdom . |
| 909950 | 11/1962 | United Kingdom . |

OTHER PUBLICATIONS

Finholt, A. E., et al., *Use of Lithium, Aluminum and Gallium Hydrides in Syntheses,* 1947, vol. 69, pp. 1199-1203.
Finholt, A. E., et al., *Hydrides of Fourth Group Elements and Their Organic Derivatives,* 1947, vol. 69, pp. 2692-2696.
Lewis, Charles H., et al., *Journal of the Electrochemical Society,* 1961, vol. 108, No. 12, pp. 1114-1118.
Yatsurugi, Y. et al., *J. Electrochem. Soc.,* 1975, pp. 1700-1705.
Padma, D. K., et al., *Journal of Fluorine Chemistry,* 1979, vol. 14, pp. 327-329.
U.S. Air Force Report AFCRC-TR-57-198.
Final Report under Contract No. AF19(60-4)-3464(1959).
Academic Press, *The Chemistry of Complex Aluminohydrides,* 1966, vol. VIII, p. 301.
W. L. Jolly editor, *Inorganic Syntheses,* 1968, vol. XI, p. 175-75.

*Primary Examiner*—John P. Sheehan
*Attorney, Agent, or Firm*—Donald L. Johnson; John F. Sieberth; Robert A. Linn

[57] ABSTRACT

A process for the production of high purity silane by reacting silicon tetrafluoride exclusively with sodium aluminum tetrahydride, potassium aluminum tetrahydride, or a mixture of sodium aluminum tetrahydride and potassium aluminum tetrahydride, preferably in an inert liquid reaction medium comprising an ether. The inventive process is a highly advantageous and economical route to silane since it also produces valuable fluoride salt.

51 Claims, No Drawings

PROCESS FOR PRODUCTION OF SILANE

BACKGROUND OF THE INVENTION

This application is a continuation-in-part of application Ser. No. 449,486 filed Dec. 13, 1982, now abandoned.

1. Field of the Invention

This invention relates to the production of silane gas ($SiH_4$) and more specifically to a highly advantageous, commercially attractive process for production of silane.

2. Description of the Prior Art

The production of pure silane is an important step in the ultimate production of ultrahigh purity silicon for semiconductor materials and in other processes.

In the past, the art has taught several schemes to synthesize silane from silicon tetrachloride ($SiCl_4$) but these have not proven commercially feasible. Rather, industry has selected various other routes for commercial silane production. For example, one foreign producer reportedly reacts magnesium silicide ($Mg_2Si$) with ammonium chloride ($NH_4Cl$) in liquid ammonia. Another domestic producer reacts silicon tetrachloride with the relatively expensive lithium aluminum tetrahydride ($LiAlH_4$). Another producer obtains various chlorosilanes by hydrochlorination of metallurgical grade silicon and then disproportionates the chlorosilanes in a catalyst bed to silane and silicon tetrachloride. Still other producers avoid silane altogether, instead depositing silicon from chlorosilanes. Thus, there exists a need to provide pure silane by an economical synthesis from readily available starting materials.

SUMMARY OF THE INVENTION

The present invention is directed to the provision of pure silane gas by an economically feasible route from readily available starting materials. The inventive process also produces valuable fluoride salt as well as high purity silane.

DESCRIPTION OF THE PREFERRED EMBODIMENTS

The present invention is a process for the production of silane wherein silicon tetrafluoride is reacted exclusively with sodium aluminum tetrahydride, potassium aluminum tetrahydride, or a mixture of sodium aluminum tetrahydride and potassium aluminum tetrahydride.

The present invention is also a process for producing silane comprising reacting gaseous silicon tetrafluoride exclusively with sodium aluminum tetrahydride, potassium aluminum tetrahydride, or a mixture of sodium aluminum tetrahydride and potassium aluminum tetrahydride in an inert liquid reaction medium and forming silane and fluoride salt.

The present invention is also a process wherein the silicon tetrafluoride is introduced into the reaction zone in non-solid form.

The present invention is also a process wherein silicon tetrafluoride is reacted with a specified alkali metal aluminum tetrahydride on a continuous basis in an inert liquid reaction mixture whereby throughout substantially the entire reaction period the reaction mixture comprises a non-viscous slurry of by-product solids (fluoride salt) in said medium.

The present invention is also the mentioned continuous process wherein the molar ratio of by-product solids to reactant tetrahydride is at least one (1:1).

The present invention also involves a process for the production of silane wherein gaseous silicon tetrafluoride is introduced into an inert liquid reaction medium containing sodium aluminum tetrahydride and the reaction medium is maintained at a temperature in the range of from about 30 to about 80 degrees Centigrade, preferably about 10 to 65 degrees Centigrade.

In a further embodiment, this invention provides a process for the production of silane which comprises introducing gaseous silicon tetrafluoride into an agitated, inert liquid polyether reaction medium containing sodium aluminum tetrahydride, the reaction mixture being maintained (i) at a temperature in the range of from about 30 to about 80 degrees Centigrade, (ii) at a pressure in the range of from about atmospheric pressure up to about 100 atmospheres, and (iii) under an atmosphere of hydrogen, silane or both.

More preferably, in a further embodiment, this invention provides a process for the production of silane which comprises introducing gaseous silicon tetrafluoride into an agitated, inert liquid reaction medium comprising an ether and containing a reactant consisting essentially of sodium aluminum tetrahydride, the reaction mixture being agitated and maintained at a temperature in the range of from about 25° to about 45° C. and at a pressure in the range of from about one to about 100 atmospheres under an atmosphere of hydrogen, silane, or both.

A still further embodiment of this invention involves a process for the economical production of high purity silane gas, said process comprising the steps of:

(a) introducing gaseous silicon tetrafluoride into an inert liquid reaction medium containing sodium aluminum tetrahydride for reaction at a temperature in the range of about 0° to about 150° C. to produce high purity silane gas and by-product solids, said liquid reaction medium being further characterized in that said by-product solids are insoluble therein and said by-product solids do not form a stable complex therewith;

(b) recovering high purity silane gas product;

(c) separating said by-product solids from said liquid reaction medium; and (d) separately recovering said liquid reaction medium and said by-product solids.

A still further embodiment of this invention includes an economical process for the production of silane which comprises introducing gaseous silicon tetrafluoride into an agitated, inert liquid reaction medium comprising an ether and containing a reactant consisting essentially of sodium aluminum tetrahydride, the reaction mixture being agitated and maintained at a temperature in the range of from about 25° to about 45° C. and at a pressure in the range of from about one to about 10 atmospheres In another embodiment of this invention, the foregoing process for the economical production of silane gas is further characterized by being conducted on a continuous basis whereby at least periodically, and preferably continuously, (a) gaseous silicon tetrafluoride and (b) sodium aluminum tetrahydride dissolved in fresh inert liquid reaction medium are separately introduced into the inert liquid reaction medium in the reaction zone, and at least periodically, and preferably continuously, (c) silane gas product and (d) liquid reaction medium containing said by-product solids are withdrawn from the reaction zone. The various objects and advantages of the invention will be apparent from a reading of this description of preferred embodiments and of the best mode of the invention now known to me.

In accordance with the present invention, pure silane gas is produced from the reaction of silicon tetrafluoride ($SiF_4$) with sodium aluminum tetrahydride ($NaAlH_4$), potassium aluminum tetrahydride ($KAlH_4$), or a mixture of sodium aluminum tetrahydride and potassium aluminum tetrahydride. The preferred reaction is silicon tetrafluoride with sodium aluminum tetrahydride.

Silicon tetrafluoride is readily produced as a gas from fluosilicic acid ($H_2SiF_6$), a by-product of the phosphate fertilizer industry and also available from other sources.

Silicon tetrafluoride offers several advantages over silicon tetrachloride. The reaction of alkali metal aluminum tetrahydride with silicon tetrachloride produces chloride salts which are strongly soluble in suitable inert liquid reaction mediums that dissolve or suspend the alkali metal aluminum tetrahydride or form a strong complex with the inert liquid reaction mediums used to dissolve or suspend the tetrahydride. Thus, a silane production process based on silicon tetrachloride, while offering the advantage of a homogeneous reaction, benefits only from its production of silane. The coproduced chloride salt is so soluble in or so complexed to the inert liquid reaction medium that it is not readily recoverable. Also, the chloride salt is of little value even if recovered. Moreover, recovery of most of the inert liquid reaction medium is difficult, expensive and provides impure liquid.

I have found that, surprisingly and most unexpectedly, alkali metal tetrahydride ($NaAlH_4$ or $KAlH_4$) reactions with silicon tetrafluoride produce fluoride salt (usually a mixture) which is quite insoluble in and does not extensively complex with the suitable inert liquid reaction mediums. I have also found that the gas-liquid reaction of the invention surprisingly results in almost complete conversion of gaseous silicon tetrafluoride to silane at moderate reaction conditions.

The excellent conversion to silane with production of useful, recoverable fluoride salt provides a silane process which benefits from a high yield of high purity silane, the value of fluoride salt, and the recovery of most of the inert liquid reaction medium. The silane is substantially free from hydrogen fluoride contamination.

For example, the fluoride by-products obtained from reaction with sodium aluminum tetrahydride or potassium aluminum tetrahydride complex with the preferred polyether reaction mediums in only minor amounts and are therefore more easily separated from the medium. By comparison, the counterpart chloride by-products, obtained by reacting sodium aluminum tetrahydride with silicon tetrachloride, are very soluble in the preferred polyether reaction medium and form stable complexes from which solvent recovery is difficult making the overall reaction less economical and less practical. Furthermore the silane made from silicon tetrachloride has been reported to be contaminated with HCl making it corrosive. While the fluorides sometimes form a viscous slurry, they are, nevertheless, ordinarily filterable for solvent recovery. On a larger scale, solvent stripping may be preferred. After solvent stripping, the fluoride salt may be rotary dried, for example in a ribbon dryer. The solubility of fluoride salt (calculated as $NaAlF_4$) for example, has been measured at 0.55 weight percent in diglyme at room temperature, whereas the solubility of sodium aluminum tetrachloride (a product of the $SiCl_4$ reaction) has been measured at about 30 percent in diglyme at room temperature.

The invention uses complex metal hydrides for reaction with silicon tetrafluoride. The complex metal hydrides of the invention include sodium aluminum tetrahydride and potassium aluminum tetrahydride. Alkaline earth metal aluminum tetrahydrides, such as magnesium aluminum tetrahydride $Mg(AlH_4)_2$ and calcium aluminum tetrahydride $Ca(AlH_4)_2$ are excluded from the invention. The sodium aluminum tetrahydride is preferred for the invention since it is more easily prepared and handled, is relatively stable, and forms by-products (fluoride salt) which are generally insoluble in favored liquid reaction mediums.

Fluoride salt produced according to the invention is generally in the form of small particles when isolated. The small particles are generally—but not always—amorphous to x-rays.

The x-ray diffraction pattern of fluoride salt produced by the process of the invention using sodium aluminum tetrahydride reveals the presence of chiolite, $Na_5Al_3F_{14}$, a well-recognized mineral. Chiolite is more easily identifiable if an x-ray diffraction pattern is taken for a fluoride salt sample which has been calcined at, e.g., 625° C. Calcining also permits identification of aluminum trifluoride, $AlF_3$, in the fluoride salt. The calcining tends to increase crystallite size, permitting easier identification. The combination of chiolite and AlF also provides theoretical agreement with the stoichiometry of the starting materials:

$$5\ NaAlH_4 + 5\ SiF_4 \rightarrow Na_5Al_3F_{14} + 2\ AlF_3 + 5\ SiH_4$$

The fluoride salt ($Na_5Al_3F_{14} + 2AlF_3$) may for convenience be expressed generically as $NaAlF_4$.

Fluoride salt, as used herein, includes those combinations of inorganic salts formed by reaction with sodium aluminum tetrahydride and potassium aluminum tetrahydride whether there are one, two, or more identifiable compounds.

The fluoride salt (mixture of chiolite and aluminum trifluoride at about a molar ratio of 2:1) has been found to be especially useful in an electrolytic cell—in place of cryolite, $Na_3AlF_6$—to produce aluminum. The compound/process for rendering aluminum from alumina, $Al_2O_3$, is commonly called the Hall process. According to the process a large electrolytic cell is charged with a fused salt bath and dry alumina is fed to the bath. Fluorine values are lost from the bath and are replenished with $AlF_3$. Since the $Na_5Al_3F_{14}.2AlF_3$ (net $5NaAlF_4$) fluoride salt of the process is richer in fluorine than cryolite, less replenishment of the cell bath with $AlF_3$ is required when the bath is made from the fluoride salt of the invention rather than cryolite. Some residual organics from the process of the invention may be present in the salt in very small amounts. The volatile organic components can be largely removed by various methods before the salt is used in an electrolytic cell for winning aluminum values. The value of the fluoride salt contributes significantly to the economic advantage of the inventive process.

Fluoride salt of the invention may also be seeded with other elements to form other useable salts (see Examples 12-13, below).

The process of the invention is preferably carried out in a liquid reaction medium. The liquid mediums of the invention include the polyethers such as the dimethyl ether of diethylene glycol (diglyme), the dimethyl ether of ethylene glycol (monoglyme), the dimethyl ether of triethylene glycol (triglyme), the dimethyl ether of tetraethylene glycol (tetraglyme), the dialkoxy 1,4-dioxane, and 1,3-dioxolanes, tetrahydrofuran (THF), hydrocarbons including toluene and xylene; simple aliphatic and aromatic ethers including diethyl ether and diphenyl ether, and tertiary amines including triethylamine, tributylamine, N-methylpyrrolidine including mixtures of any such liquids.

Liquid reaction mediums outside the preferred class of polyethers are also generally somewhat water-miscible The hydrocarbon mediums provide low to moderate yields of silane unless strong agitation, such as a ball mill reactor, is used.

The preferred liquid reaction mediums are the polyethers. These include 1,4-dioxane, 1,3-dioxolane, the diethyl ether of ethylene glycol, the dimethyl ether of ethylene glycol, the dimethyl ether of propylene glycol, the dimethyl ether of diethylene glycol, and the like.

A more preferred class of liquid reaction mediums are the di-loweralkyl ethers of alkylene glycols. These include the diethyl ether of ethylene glycol, the dimethyl ether of propylene glycol, the dimethyl ether of diethylene glycol, and the like.

Still more preferred are the di-loweralkyl ethers of ethylene glycols. These include the dimethyl ether of ethylene glycol, the dimethyl ether of diethylene glycol, the dimethyl ether of triethylene glycol, the diethyl ether of diethylene glycol, and the like.

The highly preferred medium is the dimethyl ether of diethylene glycol (diglyme). The preferred solvents of the invention are those which provide reasonable solubility for reactant sodium aluminum tetrahydride or potassium aluminum tetrahydride.

By inert, I mean a medium which does not interfere with or inhibit the production of silane and is suitable to dissolve, suspend, or otherwise contain the alkali metal tetrahydride of the process in such a manner as to provide good conversion of silicon tetrafluoride to silane. The reaction medium is innocuous. As stated above, the inert liquid reaction mediums of the invention include ethers, hydrocarbons, tertiary amines, and mixtures of these. The ethers are preferred. The ethers of the invention include polyethers and cyclic ethers as well as simple aliphatic and aromatic ethers. The simple aliphatic and aromatic ethers include diethyl ether and diphenyl ether.

The polyethers and cyclic ethers are preferred classes of ethers. The polyethers include the preferred subclasses of di-loweralkyl ethers of alkylene glycols. These include diethyl ether of ethylene glycol, dimethyl ether of ethylene glycol (dimethoxyethane or glyme), the dimethyl ether of propylene glycol, the dimethyl ether of diethylene glycol (diglyme), the dimethyl ether of triethylene glycol, and the like. The diethyl ether of ethylene glycol is an advantageous reaction medium because the normal ether cleavage attributable to solvent attack does not produce methane. The dimethyl ether of ethylene glycol is the most preferred inert liquid reaction medium.

The cyclic ethers include 1,4-dioxane, the 1,3-dioxolanes, tetrahydrofuran, and the like. Tetrahydrofuran is a highly preferred inert liquid reaction medium because the normal cleavage product from solvent attack is not gaseous.

Both dimethoxyethane and tetrahydrofuran provide good tetrahydride solubility and permit ready recovery of fluoride salt by filtering or stripping. Stripping of dimethoxyethane may be carried out at about 100° C. to 350° C., for example, preferably about 150° to 300° C.

Hydrocarbons useable in the invention include aliphatic and aromatic hydrocarbons, preferably aromatic. The aliphatic hydrocarbons include pentane, hexane, heptane, etc. The aromatic hydrocarbons include the alkylbenzenes. Of course benzene (like dioxane) is useable but is considered to be more toxic. The preferred alkylbenzenes are toluene, ethylbenzene, cumene, the xylenes, and the like. The most preferred hydrocarbon is toluene.

The hydrocarbons are of course not very water soluble in comparison to ethers. The hydrocarbons are not solvents for the tetrahydrides of the invention and do not result in good conversion of silicon tetrafluoride to silane. A ball mill reactor would assist the hydrocarbon medium reaction.

Some experiments with methyl tert-butyl ether, diphenyl ether, and toluene reaction mediums provided low yields (less than 10%, 5%, and 1%, respectively) of silane, but use of high shear agitation apparatus with reaction mixtures employing these liquid mediums would increase the yield.

The ethers are generally good solvents for the tetrahydrides of the invention and most afford excellent conversion of silicon tetrafluoride to silane. The ethers do have more of a tendency than the hydrocarbons to complex with or dissolve fluoride salt produced according to the invention. This dissolving and complexing is, however, minor when compared to the degree of dissolution/complexing found with chloride salt (such as $NaAlCl_4$) produced from silicon tetrachloride reaction with tetrahydrides.

Because of the water immiscible nature of the hydrocarbon reaction mediums, and because the tetrahydrides may often be produced in a hydrocarbon, it is preferable to use a minor portion of hydrocarbon with a major portion of ether according to the invention. A highly preferred embodiment, for example, is a mixture of about 1 to 40 parts by weight toluene and 99 to 60 parts by weight dimethoxy ethane.

Another class of inert liquid reaction mediums is the tertiary amines, including triethylamine, tributylamine, and N-methyl pyrrolidine. Like the hydrocarbons, the tertiary amines are preferably mixed in a minor proportion with an ether, preferably dimethoxy ethane.

It is preferable to carry out the reaction with a stoichiometric excess of the tetrahydrides of the invention, preferably an excess of sodium aluminum tetrahydride. The reactant silicon tetrafluoride often contains boron impurities which detract from the value of the silane when used for the production of ultrapure silicon. The excess tetrahydride reactant ties up the boron contaminants within the liquid reaction medium. Also, excess tetrahydride suppresses formation of undesirable by-products from sodium diethyl aluminum dihydride which is often carried over from the production of tetrahydride.

The concentration of tetrahydride in the liquid reaction medium is preferably at least about two percent by weight of the liquid reaction medium in a batch process. Lower concentrations are uneconomical and contribute to problems in the recovery of by-products (fluoride salt) and reaction medium. Concentrations as low as one percent by weight tetrahydride of reaction medium are commercially impractical in a batch process. Also, too large an amount of reaction medium requires unnessarily high agitation power requirements.

The preferred reactant, sodium aluminum tetrahydride, can be introduced as a solution in a polyether reaction medium and gaseous silicon tetrafluoride is added thereto for synthesis of silane. More preferably, the preferred reactant, sodium aluminum tetrahydride, is introduced as a solution in a reaction medium comprising an ether. Gaseous silicon tetrafluoride is added thereto for synthesis of silane and fluoride salt.

The use of recrystallized NaAlH$_4$ results in production of silane with lower trace amounts of hydrocarbons, e.g. ethane, which are contributed by reactions of impurities such as sodium diethyl aluminum dihydride.

The inventive process may be carried out over a broad range of temperatures. For example, silicon tetrafluoride may be metered as a gas and condensed into a reaction zone where it is frozen to a solid. Thereafter, as the temperature of the system is raised, the silicon tetrafluoride begins to react with reactant sodium aluminum tetrahydride, potassium aluminum tetrahydride, or mixture of sodium aluminum tetrahydride and potassium aluminum tetrahydride. The silicon tetrafluoride may be frozen with liquid nitrogen at about −196° C.

A suitable reaction temperature range extends up to the temperature where cleavage of the liquid reaction medium occurs and other reactions may then interfere with the invention. An applicable reaction temperature range extends up to about 160° C. A preferred range for ether reaction mediums is about 0° to 80° C. A more preferred range, especially for those reactions of the invention using ether-type liquid reaction mediums is about 40° to 70° C. A still more preferred range is about 10° to 65° C. A highly preferred reaction temperature range is 50°-60° C. The most highly preferred reaction temperature range is 20°-45° C.

Operation with a reaction medium comprising dimethoxyethane at temperatures much below 10° C. may cause gelling problems. Conversely, operating above 65° C. may result in decomposition of the medium in some cases.

The process of the invention may be conducted at, above, or below atmospheric pressure, but pressure does not strongly affect the reactivity of silicon tetrafluoride with sodium aluminum tetrahydride, potassium aluminum tetrahydride, or mixtures of sodium aluminum tetrahydride and potassium aluminum tetrahydride. An operable range of reaction pressures is one-half to one hundred atmospheres. A suitable range of reaction pressures is one to one hundred atmospheres. A preferred range is about one to forty atmospheres, more preferably, one to 10 atmospheres. Even more preferred is 0 to 25 psig. Most preferred is 3 to 5 psig. Notably, the solubility of silicon tetrafluoride is about 0.75 percent in diglyme at atmospheric pressure and is about five percent in diglyme at 500 psig.

The reaction may be carried out under an inert atmosphere. Conveniently, a silane atmosphere, optionally with a hydrogen sweep, is maintained as the product is evolved above a reaction zone, preferably in a liquid reaction medium. Argon, helium, nitrogen, and other inert gases may also be used.

The inventive process is preferably carried out with mechanical or other agitation. Agitation is improved above 50° C. in diglyme where the slurry viscosity decreases markedly.

The reaction is almost instantaneous at most reaction conditions. Where silicon tetrafluoride gas is bubbled into a liquid reaction medium, pure silane gas is readily evolved.

The reaction may be carried out without a liquid reaction mixture where silicon tetrafluoride is provided to the tetrahydride in an agitated reaction vessel such as a ball mill reactor. The ball mill reactor and similar apparatus are also preferred for certain reaction mediums such as hydrocarbons. A high shear agitation effects better reaction when such mediums are used.

Since the reaction is somewhat exothermic, evolved heat may be removed by circulating the reactants/reaction slurry through an external heat exchanger or using an internal cooling coil.

According to the invention a high purity silane is produced. Prior art processes based on silicon tetrachloride suffered from purity problems. The silane was produced with an unacceptable level of HCl requiring purification such as is disclosed in *Inorganic Syntheses*, Volume XI, W. L. Jolly editor, at pages 170, 174–75, McGraw-Hill Book Company, N.Y. (1968). The present invention unexpectedly produces silane containing extremely low total fluorides such that possibly no HF is present as demonstrated in Example 1 below.

A preferred embodiment of the invention is the continuous feed of silicon tetrafluoride gas and sodium aluminum tetrahydride dissolved in diglyme. This embodiment includes operation of the reaction in a continuous back-mixed reactor, operated at conditions approaching completion of the reaction. Once the molar concentration of the by-product solids in the slurry of the reaction zone exceeds the molar amount of tetrahydride reactant, the consistency of the slurry goes from a high viscosity (thick) to a moderate viscosity (thin). This is favorable to mass transfer of the gaseous silicon tetrafluoride to the liquid slurry and therefore, a more complete and rapid reaction results.

A preferred embodiment of the invention is the continuous feed of (1) silicon tetrafluoride gas and (2) sodium aluminum tetrahydride dissolved in dimethoxyethane containing about 20–40% by weight toluene. This embodiment includes operation of the reaction in a continuous back-mixed reactor, operated at conditions approaching completion of the reaction. The initial reaction mixture is quite non-viscous but builds to a maximum viscosity at about an equimolar content of fluoride salt (calculated as NaAlF$_4$) and tetrahydride reactant. Once the molar concentration of the by-product solids (fluoride salt) in the slurry of the reaction zone exceeds the molar amount of tetrahydride reactant, the consistency of the slurry goes from a maximum viscosity (thick) to a moderate viscosity (thin). This is favorable to mass transfer of the gaseous silicon tetrafluoride to the liquid slurry and unexpectedly requires less agitation. This is more economical and therefore, a more complete and rapid reaction results. Of course, operation at the initial low viscosity, low concentration of fluoride salt does not permit good utilization of reactants, requiring the uneconomical recycling of reactants.

Accordingly another preferred embodiment of the invention is a continuous process for making substantially pure silane and a valuable fluoride salt complex, said process comprising (a) feeding silicon tetrafluoride to a reaction zone containing an inert reaction media under an inert atmosphere, said reaction media containing sodium aluminum tetrahydride, said reaction media comprising tetrahydrofuran, dioxane, dioxolane, an acyclic polyether, a tertiary amine, hydrocarbon or mixture thereof, (b) feeding sodium aluminum tetrahydride to said reaction media so as to maintain a stoichiometric excess above that required to convert the silicon tetrafluoride feed to silane, (c) recovering silane as a gaseous overhead product, (d) withdrawing a liquid purge stream of said inert reaction media which contains a slurry of said fluoride salt complex at a rate which maintains a substantially constant liquid volume in said reaction zone and also maintains the concentration of said fluoride salt in said reaction media at a molar concentration, expressed as moles $NaAlF_4$, above the molar concentration of sodium aluminum tetrahydride but below about forty weight percent, and (e) recovering said fluoride salt from the reaction media purge. The continuous process is preferably run such that the molar ratio of fluoride salt (expressed as $NaAlF_4$) to sodium aluminum tetrahydride in the liquid reaction media is at least about 2:1 and the weight percent of fluoride salt is below about twenty weight percent.

Contrary to the batch process of the invention, the concentration of tetrahydride in the liquid reaction medium may well, and preferably does, fall below two percent by weight of the reaction medium in a continuous process. The advantages of the continuous process override any problems mentioned above with respect to the batch process.

The following examples further serve to illustrate the invention.

EXAMPLE 1

A one-quarter inch stainless steel conduit was connected to a tap into the vapor space above the liquid level in an enclosed silane reactor which contained a reaction mixture formed by feeding a solution of $NaAlH_4$ in dimethoxyethane and injecting $SiF_4$ gas into the liquid phase at 50° C. The mixture reacted and formed $SiH_4$ gas which entered the vapor space of the reactor and was removed upwardly through a column. To the one-quarter inch conduit was connected a stainless steel scrubber apparatus containing 70 mLs distilled water (distilled water is known to remove HF from various gas streams). Also connected to the one-quarter inch stainless steel conduit was a by-pass conduit for flushing the one-quarter inch conduit prior to obtaining a sample (in order to obtain a representative steady-state sample for scrubbing).

The scrubber was maintained about 4°–5° C. in an ice/water bath.

The conduit exiting the scrubber was coiled for a sufficient length to allow the gas sample (silane) to warm to about 20° C. (room temperature) and prevent condensation of any dimethoxyethane and water vapor in the gas. A rotameter was connected to the conduit after the coiled section. This equipment arrangement permitted an accurate determination of the volume of gas through the scrubber.

While the silane reactor was in continuous operation the valve on the vapor space tap was opened and the one-quarter inch stainless steel sample conduit from the silane reactor was thoroughly purged with vapor space gas. The scrubber apparatus was purged with helium.

A sample of the vapor space gas (silane) was removed and passed through the scrubber at the rate of 4 standard cubic feet per hour, as measured on the rotameter, for a period of 10 minutes. Any HF in the silane would dissolve in the distilled water. The quantity of the vapor space gas sample was then calculated to be 18.87 liters or 25.2 grams silane scrubbed.

The scrubber assembly was purged with helium and the scrubber solution was analyzed for total fluorides. The distilled water solution was evaporated from the scrubber to a small volume (about 10 mLs) and analyzed for fluorides by the Spadns colorimetric method for fluoride (Spadns reagent) which is a standard fluoride analysis procedure. The sample was determined to contain 32.7 micrograms total fluorides. Based on the amount of silane in the gas sample, this calculates to about 1 part by weigh total fluorides per million parts by weight silane. Of course this determination for fluorides is total fluorides. The level of HF, if present in any amount at all, is less than 1 part per million by weight. These results also show that the reaction between $SiF_4$ and $NaAlH_4$ is substantially quantitative.

EXAMPLE 2

To a 50 mL three-necked, round bottom reaction flask was added 10 millimoles of sodium aluminum tetrahydride ($NaAlH_4$) as a 4% solution in diglyme. The flask was connected to a gas collection train and purged with prepurified hydrogen. A one-eighth inch diameter polytetrafluoroethylene tube was connected to a reservoir of silicon tetrafluoride gas with one end extending into the flask below the surface of the sodium aluminum tetrahydride/diglyme solution. A condenser following the reactor was cooled with a mixture of dry ice and acetone and a product trap was chilled in liquid nitrogen. Magnetic stirring was started and silicon tetrafluoride was bled in beneath the surface of the solution at a feed rate of 10 millimoles over a thirty minute period. The temperature of the diglyme solution of sodium aluminum tetrahydride was 50° C. when the silicon tetrafluoride feed was started and gradually rose to a final temperature of 60° C. After the addition of about 10 millimoles silicon tetrafluoride, the reactor and collection system were swept with hydrogen for an additional 30 minutes. The valve between the condenser and the product trap was blocked and the trap and collection system were evacuated. The calibrated section was isolated and the condensed product was permitted to vaporize into it. The amount of gaseous product was calculated by means of the ideal gas law based upon observed initial and final pressures. A sample was analyzed by mass spectrometry and the yield of silane was 99 percent based on sodium aluminum tetrahydride charged.

EXAMPLE 3

The general procedure of Example 2 was followed except that the reaction was conducted at 60°–70° C. The silane yield on sodium aluminum tetrahydride was 90 percent.

EXAMPLE 4

The general procedure of Example 2 was followed except that the reaction was conducted at 55° C. and 30 psig pressure. Also, a slight stoichiometric excess (1.0:0.97) of silicon tetrafluoride was used. The yield after one hour was 96 percent and the product silane contained some silicon tetrafluoride gas.

EXAMPLE 5

The same general procedure of Example 2 was followed except that the reaction was conducted at 50° C.

and 60 psig. The yield was 80 percent and the product silane contained some silicon tetrafluoride.

EXAMPLE 6

The same general procedure of Example 2 was followed except that the reaction was conducted at 50° C. and 53 psig. Also, a stoichiometric excess (1.0:1.2) of sodium aluminum tetrahydride was used. The yield was 96 percent silane, free of silicon tetrafluoride.

EXAMPLE 7

The same general procedure of Example 2 was followed. However, the sodium aluminum tetrahydride was supplied as a six percent solution in diglyme and the reaction was conducted at 50° C. and 60 psig. Also, a stoichiometric excess (1.0:1.2) of sodium aluminum tetrahydride was again employed. After two hours, the yield was 97 percent silane, again free of silicon tetrafluoride.

EXAMPLE 8

The general procedure of Example 2 was followed. However, the sodium aluminum tetrahydride was supplied as a five percent solution and the silicon tetrafluoride was fed above the surface of the liquid reaction medium. A stoichiometric excess (1.0:0.91) of silicon tetrafluoride was reacted at 50° C. and atmospheric pressure. The yield of silane after two hours was 98 percent.

EXAMPLE 9

The same general procedure was followed as in Example 2 except that the liquid reaction medium also contained some tetrahydrofuran and the reaction was conducted at 25°–50° C. The yield of silane was 86 percent.

EXAMPLE 10

The same general procedure of Example 2 was followed except that the sodium aluminum tetrahydride was recrystallized prior to use. The reaction at 55° C. and 33 psig provided a silane yield of 86 percent after one hour.

EXAMPLE 11

The same general procedure of Example 2 was followed. A stoichiometric excess (1.0:1.3) of recrystallized sodium aluminum tetrahydride was employed in a 4.5 percent solution of dimethoxyethane at 23° C. and atmospheric pressure. The silane yield after one hour was 84 percent.

It is possible to conduct the inventive process with the introduction of seed materials into the reaction zone. The seed materials include MgO, $Na_2SiF_6$, $CaCO_3$, NaF, and others. Also, some runs were made under similar conditions to those in the examples above with similarly good results.

MgO seed produced neighborite, $NaMgF_2$ which, after calcining, was identified by x-ray diffraction. $CaCO_3$ seed produced fluorspar, $CaF_2$, also identified by x-ray diffraction after calcining. Fluorspar has many known utilities including production of HF. $Na_2SiF_6$ seeding produced various results. Sometimes the salt was $Na_2SIF_6$ and NaF (before calcining) and sometimes the salt was NaF plus cryolite plus chiolite.

Examples 12 and 13 demonstrate the addition of seed materials to the reaction mixture.

EXAMPLE 12

The same general procedure of Example 2 was followed except that about 20 millimoles MgO was also put into the reaction mixture with the sodium aluminum tetrahydride. The silane yield was high and the by-product (fluoride salt) slurry was more quickly filtered than the slurry from the Examples above.

EXAMPLE 13

The same general procedure of Example 2 was followed except that 4 millimoles sodium fluosilicate ($Na_2SiF_6$) was added to the reaction mixture. The yield of silane was 94 percent and the nature of the by-product solids (fluoride salt) was changed.

The above description of the preferred embodiments is merely illustrative and many aspects of the invention may be varied without departure from the scope or spirit thereof, as defined by the appended claims.

I claim:

1. A process for the production of silane wherein silicon tetrafluoride is reacted in an inert liquid reaction exclusively with sodium aluminum tetrahydride, potassium aluminum tetrahydride, or a mixture of sodium aluminum tetrahydride and potassium aluminum tetrahydride.

2. The process of claim 1 wherein the silicon tetrafluoride is introduced into the reaction zone in gaseous form.

3. The process of claim 2 wherein said silane is essentially free of HF contamination.

4. The process of claim 3 wherein said reaction medium comprises a polyether.

5. The process of claim 4 wherein said polyether is a di-loweralkyl ether of an alkylene glycol.

6. The process of claim 5 wherein said polyether is the dimethyl ether of ethylene glycol (dimethoxyethane).

7. A process for producing silane comprising reacting gaseous silicon tetrafluoride exclusively with sodium aluminum tetrahydride, potassium aluminum tetrahydride, or a mixture of sodium aluminum tetrahydride and potassium aluminum tetrahydride in an inert liquid reaction medium and forming silane and fluoride salt.

8. The process of claim 7 wherein silicon tetrafluoride is reacted exclusively with sodium aluminum tetrahydride.

9. The process of claim 8 wherein said fluoride salt is a mixture of fluoride salts.

10. The process of claim 9 wherein said mixture of fluoride salts is predominantly a mixture of $AlF_3$, and chiolite ($Na_5Al_3F_{14}$).

11. The process of claim 10 wherein the molar ratio of $AlF_3$ to chiolite is about 2:1.

12. The process of claim 7 wherein said inert liquid reaction medium comprises an ether.

13. The process of claim 12 wherein said ether is a polyether.

14. The process of claim 13 wherein said polyether is a di-loweralkyl ether of an alkylene glycol.

15. The process of claim 14 wherein said polyether is the dimethyl ether of ethylene glycol (dimethoxyethane).

16. The process of claim 13 wherein said polyether is a di-loweralkyl ether of a polyethylene glycol.

17. The process of claim 16 wherein said polyether is the dimethyl ether of diethylene glycol.

18. The process of claim 12 wherein said ether is a cyclic ether.

19. The process of claim 18 wherein said cyclic ether is tetrahydrofuran.

20. The process of claim 18 wherein said cyclic ether is 1,3-dioxolane.

21. The process of claim 12 wherein said inert reaction medium also contains a hydrocarbon.

22. The process of claim 21 wherein said hydrocarbon is an aromatic hydrocarbon.

23. The process of claim 22 wherein said aromatic hydrocarbon is toluene.

24. The process of claim 12 wherein said inert reaction medium also comprises a tertiary amine.

25. The process of claim 24 wherein said tertiary amine is triethylamine.

26. The process of claim 7 wherein the reaction is performed on a batch basis in an inert liquid reaction medium comprising an ether and proportioned such that the initial concentration of the sodium aluminum tetrahydride or the potassium aluminum tetrahydride or the mixture of sodium aluminum tetrahydride and potassium aluminum tetrahydride is at least about 2% by weight based on the weight of the liquid reaction medium.

27. The process of claim 7 wherein the reaction is performed on a continuous basis in an inert liquid reaction medium comprising an ether and whereby throughout substantially the entire reaction period the reaction mixture comprises a relatively non-viscous slurry of fluoride salt in said medium.

28. The continuous process of claim 27 wherein the molar ratio of fluoride salt to reactant sodium aluminum tetrahydride, potassium aluminum tetrahydride, or mixture of sodium aluminum tetrahydride and potassium aluminum tetrahydride is at least about 1:1.

29. The process of claim 7 wherein the reaction is conducted with agitation.

30. The process of claim 7 conducted under an inert atmosphere.

31. The process of claim 30 wherein the reaction is conducted under an atmosphere of hydrogen, silane, or both.

32. The process of claim 7 wherein the gaseous silicon tetrafluoride is introduced into said inert liquid reaction medium containing sodium aluminum tetrahydride, potassium aluminum tetrahydride, or a mixture of sodium aluminum tetrahydride and potassium aluminum tetrahydride, and wherein said inert liquid reaction medium is maintained at a temperature of about 10° to 65° C.

33. The process of claim 32 wherein said temperature is about 20° to 45° C.

34. The process of claim 7 wherein throughout substantially the entire reaction period the reaction mixture contains a stoichiometric excess of sodium aluminum tetrahydride, potassium aluminum tetrahydride, or mixture of sodium aluminum tetrahydride and potassium aluminum tetrahydride.

35. The process of claim 7 wherein said reaction is carried out at a pressure of about one-half to one hundred atmospheres.

36. The process of claim 35 wherein said pressure is in the range of from 0 to 25 psig.

37. The process of claim 36 wherein said process is in the range of about 3 to 5 psig.

38. A process for the production of silane comprising introducing gaseous silicon tetrafluoride into an inert liquid reaction medium comprising an ether, said ether containing at least a stoichiometric amount, based on silicon tetrafluoride, of sodium aluminum tetrahydride reactant, and reacting said gaseous silicon tetrafluoride and said sodium aluminum tetrahydride reactant to form silane gas and fluoride salt by-product, the reaction mixture being agitated and maintained at a temperature in the range of from about 20° C. to about 45° C. and at a pressure in the range of from about one to about 10 atmospheres.

39. The process of claim 38 wherein the reaction is performed on a continuous basis whereby throughout substantially the entire reaction period the reaction mixture comprises a slurry of fluoride salt and sodium aluminum tetrahydride in said medium and the molar ratio of fluoride salt to reactant sodium aluminum tetrahydride is at least about one.

40. The process of claim 39 wherein throughout substantially the entire reaction period the reaction mixture contains a stoichiometric excess of sodium aluminum tetrahydride.

41. An economical process for producing high purity silane gas and fluoride salt, said process comprising the steps of:
(a) introducing gaseous silicon tetrafluoride into an inert liquid reaction medium comprising an ether, said inert liquid reaction medium containing at least a stoichiometric amount, based on silicon tetrafluoride, of sodium aluminum tetrahydride reactant and reacting said silicon tetrafluoride and said sodium aluminum tetrahydride at a temperature of 10° to 65° C.;
(b) forming silane gas and fluoride salt; and
(c) recovering said silane gas.

42. The process of claim 41 further comprising separating said fluoride salt from said inert liquid reaction medium to recover said fluoride salt and said inert liquid reaction medium.

43. The process of claim 41 wherein said ether is dimethoxyethane or tetrahydrofuran.

44. The process of claim 43 wherein said ether further contains a hydrocarbon.

45. The process of claim 44 wherein said hydrocarbon is toluene.

46. A process for co-producing substantially pure silane and a fluoride salt useful in the production of aluminum by the Hall process, said fluoride salt consisting essentially of a mixture of chiolite and aluminum fluoride, said process comprising:
(a) reacting silicon tetrafluoride with a stoichiometric excess of sodium aluminum tetrahydride in an inert solvent consisting mainly of an ether selected from acyclic polyethers, tetrahydrofuran, 1,4-dioxane, 1,3-dioxolanes, and mixtures thereof, and forming silane and said fluoride salt;
(b) recovering said silane in gaseous form essentially free of HF contamination; and
(c) recovering said fluoride salt as a useful by-product.

47. A process of claim 46 wherein said solvent is a polyether.

48. A process of claim 47 wherein said polyether is dimethyl ether of ethylene glycol (dimethoxyethane).

49. A process of claim 47 wherein said polyether is a di-loweralkyl ether of diethylene glycol.

50. A process of claim 49 wherein said polyether is the dimethyl ether of diethylene glycol.

51. A process of claim 46 wherein said ether is tetrahydrofuran.

* * * * *

UNITED STATES PATENT AND TRADEMARK OFFICE
CERTIFICATE OF CORRECTION

PATENT NO. : 4,632,816
DATED : December 30, 1986
INVENTOR(S) : Everett M. Marlett It is certified that error appears in the above-identified patent and that said Letters Patent is hereby corrected as shown below:

The last item under References Cited, OTHER PUBLICATIONS reads "W. L. Jolly, editor, Inorganic Synthesis, 1968, vol. XI, p. 175-75." and should read -- W. L. Jolly, editor, Inorganic Synthesis, 1968, vol. XI, pp 170 and 174-75 --.

Column 4, line 31, reads "AlF" and should read -- $AlF_3$ --.

Column 5, line 13-14, reads "water-miscible The" and should read -- water-miscible. The --.

Column 10, line 12 reads "weigh" and should read -- weight --.

Column 12, line 22-23, reads "reaction exclusively" and should read -- reaction medium exclusively --.

Signed and Sealed this

Twenty-eighth Day of April, 1987

Attest:

DONALD J. QUIGG

Attesting Officer

Commissioner of Patents and Trademarks